United States Patent [19]

Yeager et al.

[11] Patent Number: 5,649,112
[45] Date of Patent: Jul. 15, 1997

[54] METHOD AND APPARATUS FOR MODIFYING MICROCODE IN A DISTRIBUTED NODAL NETWORK WHILE THE NETWORK CONTINUES OPERATION

[75] Inventors: John D. Yeager, San Jose; Lawrence Y. Ho, Morgan Hill; Chester R. Stevens, San Jose; James T. Brady, San Jose; David T. Wang, San Jose, all of Calif.

[73] Assignee: International Business Machines Corporation, Armonk, N.Y.

[21] Appl. No.: 593,551

[22] Filed: Jan. 30, 1996

Related U.S. Application Data

[63] Continuation of Ser. No. 241,901, May 11, 1994, abandoned.

[51] Int. Cl.$^6$ .......................... G06F 15/177; G06F 13/42
[52] U.S. Cl. .................. 395/200.1; 395/200.07; 395/701; 364/276.3; 364/281.9; 364/280.3; 364/962.1; 364/DIG. 1
[58] Field of Search .............. 395/200.07, 200.09, 395/200.1, 430, 700, 828; 340/825.05, 825.3, 825.5; 364/276.3, 281.9, 280.3, 962.1

[56] References Cited

U.S. PATENT DOCUMENTS

| | | | |
|---|---|---|---|
| 4,769,767 | 9/1988 | Hilbrink | 364/200 |
| 5,019,992 | 5/1991 | Brown et al. | 364/468 |
| 5,155,837 | 10/1992 | Liu et al. | 395/500 |
| 5,155,847 | 10/1992 | Kirouac et al. | 395/600 |
| 5,165,018 | 11/1992 | Simor | 395/200 |
| 5,210,854 | 5/1993 | Beaverton et al. | 395/500 |
| 5,359,730 | 10/1994 | Marron | 395/650 |
| 5,421,009 | 5/1995 | Platt | 395/200.1 |

*Primary Examiner*—Alyssa H. Bowler
*Assistant Examiner*—Mark H. Rinehart
*Attorney, Agent, or Firm*—Ohlandt, Greeley, Ruggiero & Perle

[57] ABSTRACT

Updating of control code is accomplished in multiple nodes of a computing system while the computing system remains in operation. Each node includes a processor, memory, a first version of a control code unit and an engineering change level indication for the control code unit. The method comprises the steps of: installing a revised version of the control code unit with converter code modules in a first node, the converter code modules enabling and performing first and second interface functions during communications between the first node and other nodes in the system. The first node is then operated to perform a function which requires communication with other nodes, the converter code module in the first node initially determining an engineering change level value stored in another node and, if the engineering change level values in the nodes match, communicating with the other node through the first interface function. If the engineering change level values are found not to match, communications occur with the other node through the use of the second interface function, enabling both nodes to communicate even though different level code changes are present. A sequencer is also provided in the computing system which enables updating of all nodes in a specified sequence so as to simplify the requirements placed upon the converter code module.

9 Claims, 6 Drawing Sheets

SEQUENCER STEP 1

FIG. 3D

AFTER SEQUENCER STEPS 4 & 5

METHOD AND APPARATUS FOR MODIFYING MICROCODE IN A DISTRIBUTED NODAL NETWORK WHILE THE NETWORK CONTINUES OPERATION

This is a continuation of application Ser. No. 08/241,901 filed on May 11, 1994, now abandoned.

FIELD OF THE INVENTION

This invention relates to multi-nodal networks and, more particularly, to apparatus and procedures for enabling the network to continue operating while modified microcode is installed on one or more nodes of the network.

BACKGROUND OF THE INVENTION

As distributed processing systems have become more complex, customer requirements for system availability have also become more stringent. Distributed processing systems includes multiplicities of nodes (e.g. on the order of hundreds to thousands), each node including a processor and various support modules. A distributed processing system can require multiple megabytes of control code to enable efficient functioning of the system. As function is added to such a system, control code sizes can grow to tens of megabytes. Such large control codes invariably require changes, updates, alterations, etc. If a distributing processing system is required to be placed out of service each time a code change is installed, a customer's use of the system is significantly disrupted.

The prior art describes various techniques for enabling installation of an update to a control code while maintaining some level of system operability. U.S. Pat. No. 5,155,837 to Liu et al. describes a time-shared multi-processor system wherein either application programs or operating system programs can be retrofitted without service interruption. Processors in the system are divided into two logical partitions. The old version of the software runs in one partition while the new version is loaded into and started up in the other partition. When the new version is verified to be properly operating, data traffic is transferred from the old version partition to the new version partition in two steps. First, the input data is switched to the new version. When the transactions in process in the old version are all completed, the output data is switched from the old version to the new version.

U.S. Pat. No. 5,210,854 to Beaverton et al. describes a system for updating programs stored in a programmable read only memory. During an updating procedure, a new version of a sub-routine is stored in a free area of the programmable read only memory. Such storage occurs after a control device has partitioned the firmware resident in the programmable read only memory to prevent writing to protected partitions of the system's firmware. Transfer vectors are used to provide indirect addressing of sub-routines resident in the firmware. After the updated version of a subroutine is stored, the transfer vector pointing to the old version of the subroutine is updated to indicate the new version.

In sum, microcode changes in older processing systems generally necessitated the shut down of the machine, resulting in customer disruption. In more recent products, where there are two identical clusters of nodes or machines, a microcode change is activated one at a time in each cluster. When one half of the system is being updated, the other half is operating independently at the same time. However, communications between the two sides of the system are disconnected when the two sides are at different change levels.

It is accordingly an object of this invention to enable code updates in a multi-nodal system, wherein communications between nodes that are at different levels of code change are enabled.

It is another object of this invention to provide a multi-nodal system with apparatus for installing control code updates, wherein the multi-nodal system continues operation during the installation process.

It is yet another object of this invention to provide a method and apparatus for installing code updates on a multi-nodal system wherein code revisions are installed in accordance with a predetermined sequence.

SUMMARY OF THE INVENTION

Updating of control code is accomplished in multiple nodes of a computing system while the computing system remains in operation. Each node includes a processor, memory, a first version of a control code unit and an engineering change level indication for the control code unit. The method comprises the steps of: installing a revised version of the control code unit with converter code modules in a first node, the converter code modules enabling and performing first and second interface functions during communications between the first node and other nodes in the system. The first node is then operated to perform a function which requires communication with other nodes, the converter code module in the first node initially determining an engineering change level value stored in another node and, if the engineering change level values in the nodes match, communicating with the other node through the first interface function. If the engineering change level values are found not to match, communications occur with the other node through the use of the second interface function, enabling both nodes to communicate even though different level code changes are present. A sequencer is also provided in the computing system which enables updating of all nodes in a specified sequence so as to simplify the requirements placed upon the converter code module.

DETAILED DESCRIPTION OF THE INVENTION

Figure 1:
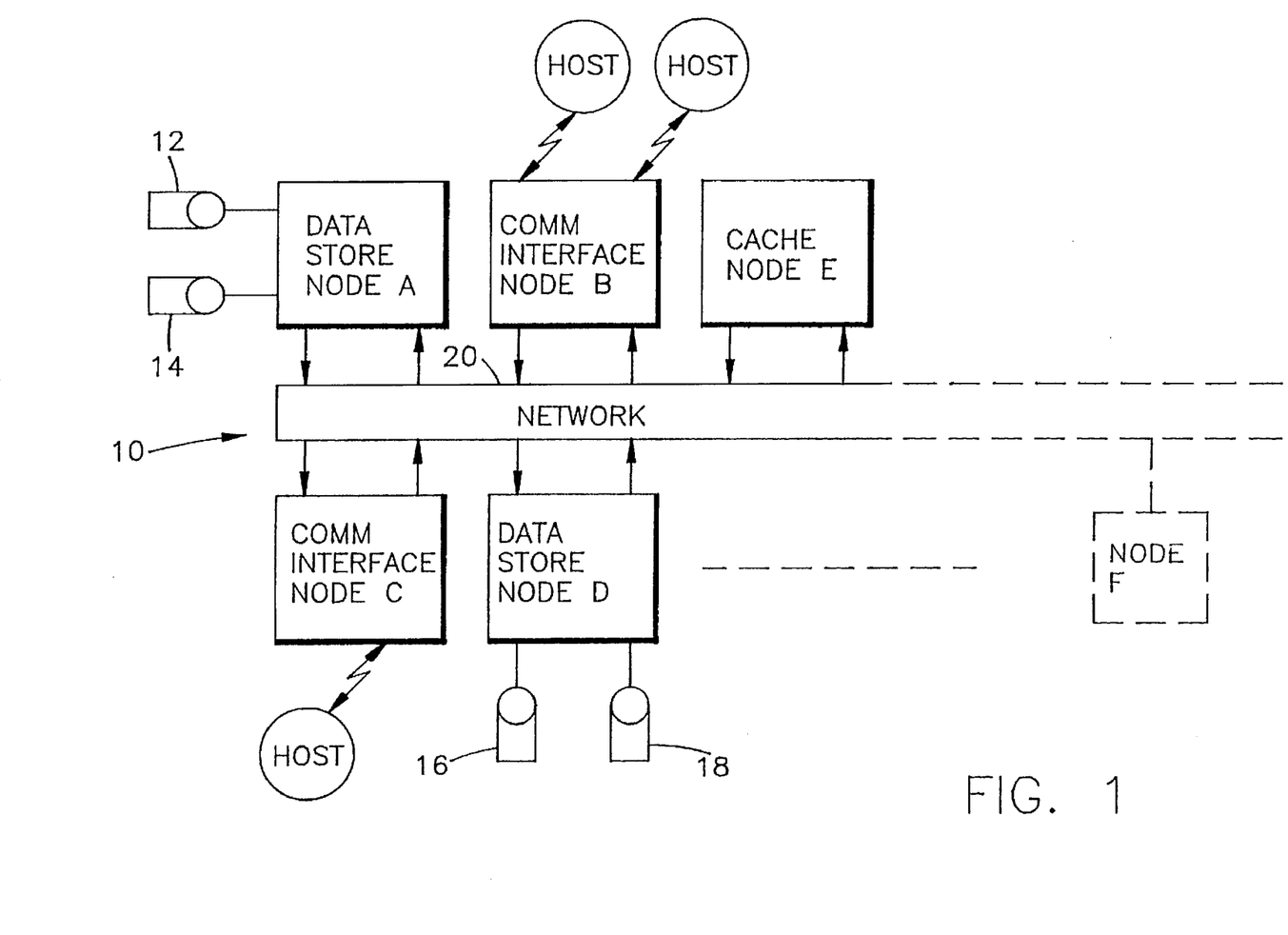
FIG. 1 is a block diagram illustrating a multi-node system which includes multiple nodes for providing disk drive memory capabilities to connected host processors.

FIG. 1 illustrates a disk drive array 10 configured as a multi-node network. Nodes A and D are data storage nodes that connect to coupled disk drives 12, 14 and 16, 18, respectively. While only four disk drives are shown, one skilled in the art will realize that disk drive array 10 will include many more disk drives (and many more nodes). A pair of communication interface nodes B and C provide input/output communication functions for the array. Host processors are coupled to nodes B and C via communication links. Array 10 further includes a cache node E which provides a temporary storage facility for both input and output data transfers from disk. Array 10 is expandable by addition of further nodes (e.g. node F), all of which are interconnected by a communication network 20.

Figure 2:
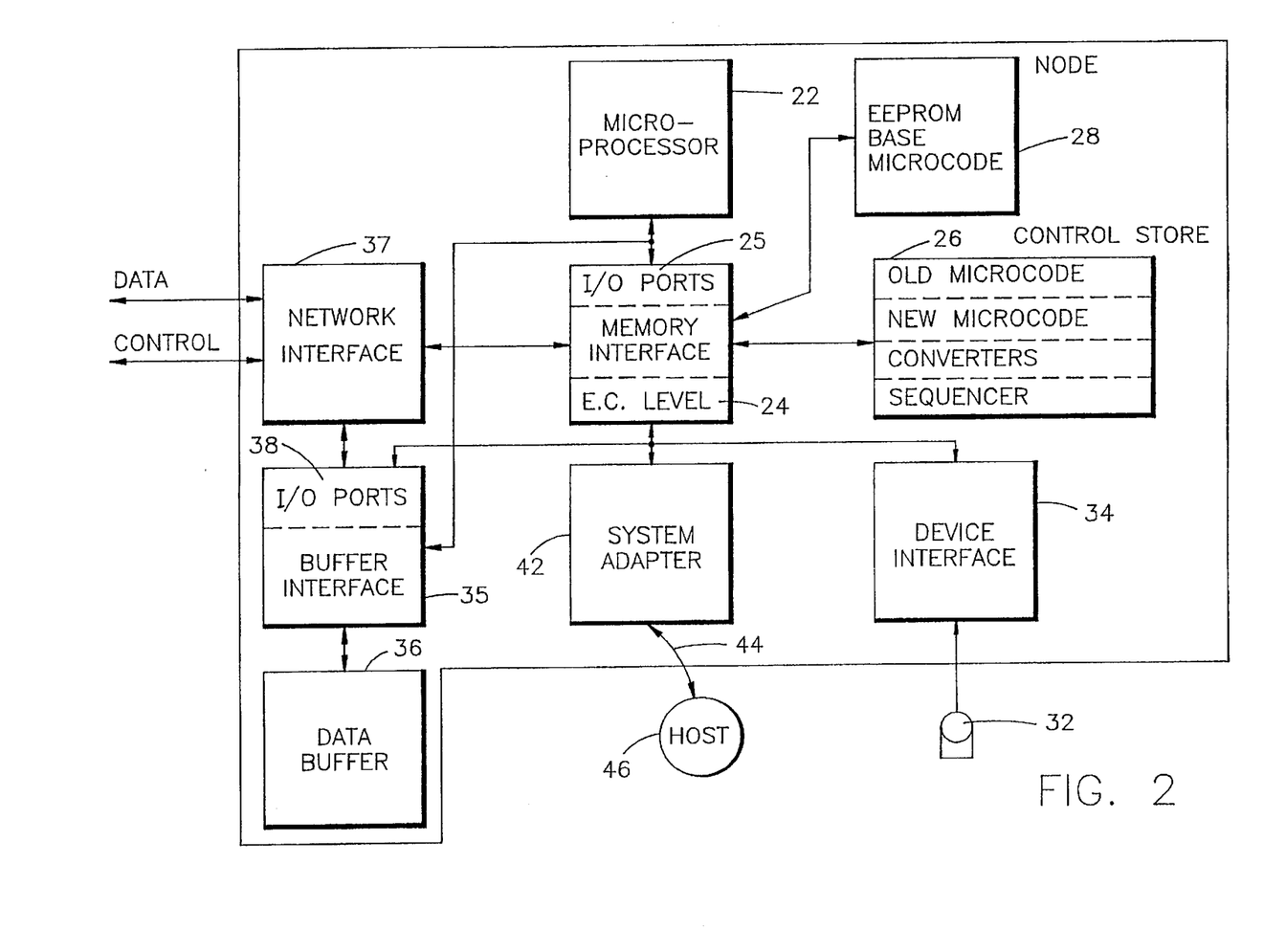
FIG. 2 is a block diagram of an exemplary node employed in the system of FIG. 1.

Each of nodes A–F is configured in a standard node arrangement shown in FIG. 2. A node includes a microprocessor 22 that controls the overall functioning of the node. A memory interface module 24 controls communications between microprocessor 22 and plural memory modules within the node. Memory interface module 24 also includes input/output hardware 25 for handling of control messages. A control store 26 contains control code that operates microprocessor 22 and enables the node to perform its data processing functions. An electrically erasable, programmable read only memory 28 provides a storage area for base microcode which is the control code that enables a bootstrap start up of the node upon a power-up or a reset operation. During power-up, the base microcode is loaded via memory interface 24 into control store 26. Once the base microcode is present in control store 26, it enables microprocessor 22 to load the remainder of the system's microcode (i.e., "functional" microcode) from a disk drive 32 through a device interface 34 and memory interface 24 to control store 26. When both base and functional microcode have been loaded, control store 26 contains sufficient microcode to enable the node to perform all of its data processing functions.

Plural disk drives 32 (only one is shown) are connected via device interfaces 34 to memory interface 24 and a data buffer interface 35. Data buffer interface 35 connects a data buffer 36 to network interface 37. Data buffer 36 provides buffering functions for both incoming and outgoing data messages (as contrasted to control messages). Buffer interface 35 further includes input/output hardware ports 38 for handling of received data. Input/output hardware ports 38 in buffer interface 35 and input/output hardware ports 25 in memory interface 24 are controlled by entries in control store 26. Network interface 37 provides interface functions for both incoming and outgoing message transfers.

During operations of multi-nodal system 10 (FIG. 1), the control microcode in one or more of nodes A–F, etc. will invariably need to be updated, changed and/or modified. It is a feature of the invention that this function occurs without requiring multi-nodal system 10 to be taken out of service. The control microcode of multi-nodal system 10 enables data processing actions therein to continue, even in the event one node is temporarily removed from service. To that end, one or more additional redundant nodes may be provided to be placed into operation in the event a node is removed from service (e.g. see node F that is shown in phantom in FIG. 1). As an alternative, work assigned to a node being updated may be assigned, temporarily, to another operating node, or may be re-scheduled to be performed after the node is updated and other nodes are being updated. To accomplish a microcode conversion, the operating software present in each node must be able to remove a node from the system "on-the-fly" and to fence off and put back on line any link to a node within the network. The methods for performing these functions are beyond the scope of this invention and will not be further described in detail, except to the extent to assume their presence in the nodal system of FIG. 1.

Hereafter, a procedure for "hot plugging" microcode is described that enables a non-disruptive update to code while the code is in a run condition. In order to accomplish such a "hot plug" action, the microcode must address a temporary incompatibility between two levels of code while they are executed simultaneously on the system. Hot plugging of code, as employed herein, is configured to provide an ability to install a code change either at a node level where changes affect only operations internal to a node; where changes span across plural node boundaries; and in cases where a code change not only spans multiple node but also requires an ordering of updates across the nodes.

The simplest type of hot plug code change is one wherein all code modifications occur within one node and are not manifest at the nodal interface such as to require a modification of code in another node. A node that contains software components to be updated is removed from system operation because, as mentioned above, the system is programmed to tolerate the loss of one node and to continue operating with the remaining nodes. Additionally, the system may substitute a standby node (e.g., node F) as a temporary substitute for the node that is taken out of service. For the node that is taken out of service, revised code is loaded thereinto (assuming a full node microcode update), the node is then reset and the operating software is re-linked with the updated code. The node is then is put back into operation to join the other nodes which have remained operational while the node is being updated. This procedure sequences through additional nodes which require a code update, one node at a time.

The above description considers a full node-level update of code. To accomplish a module-level update within a single node (i.e. an update of less than the entire microcode), the revised modules are installed and thereafter, the modules that require changes are unlinked and their replacement modules are linked into the code, dynamically, as the rest of the software components continue running.

To accomplish a hot plug of a code revision wherein more than one node is involved, the invention makes use of a converter code module which comprises additional code written for a new code unit to handle interface functions for the new code and with another code unit. Use of converters may occur in node-level updates, module level updates and any code updates which lead to an interface between nodes being affected. A converter accommodates temporary incompatibilities between two code units at different engineering change levels. Inside each revised code unit, one converter is designed and coded for one affected interface. The same revised code unit may require several converters to handle separate interfaces. For an interface between two code units, when both code units have been changed, a pair of converters may be needed, one in each code unit to match the code levels between the two. If there is a sequence of updating of two code units, only the code unit that is updated first needs a converter.

In a node level update, a node just updated with a new level of code must interface with nodes which are still at the old engineering change level. The new-level code must contain within itself one converter for each affected interface. Each converter serves to direct operations or protocols to equivalent functions of the old code when encountered in another node. A converter thus acts as a temporary bridge until all nodes are updated to the same engineering change level.

A further module, i.e. a "sequencer" code module, controls a sequence of application of code changes to multiple nodes within a multi-node system. A sequencer both insures that all changes are installed on all nodes containing an affected code unit and, if there is a sequence dependency between parts of the change, it insures that the installation is in the order specified by a "script". More specifically, the sequencer script manages the ordering of updates among the various code units and nodes. If no sequencer script is provided for the revised code, code modifications follow a default script through the installed nodes on the system.

Figure 3A:
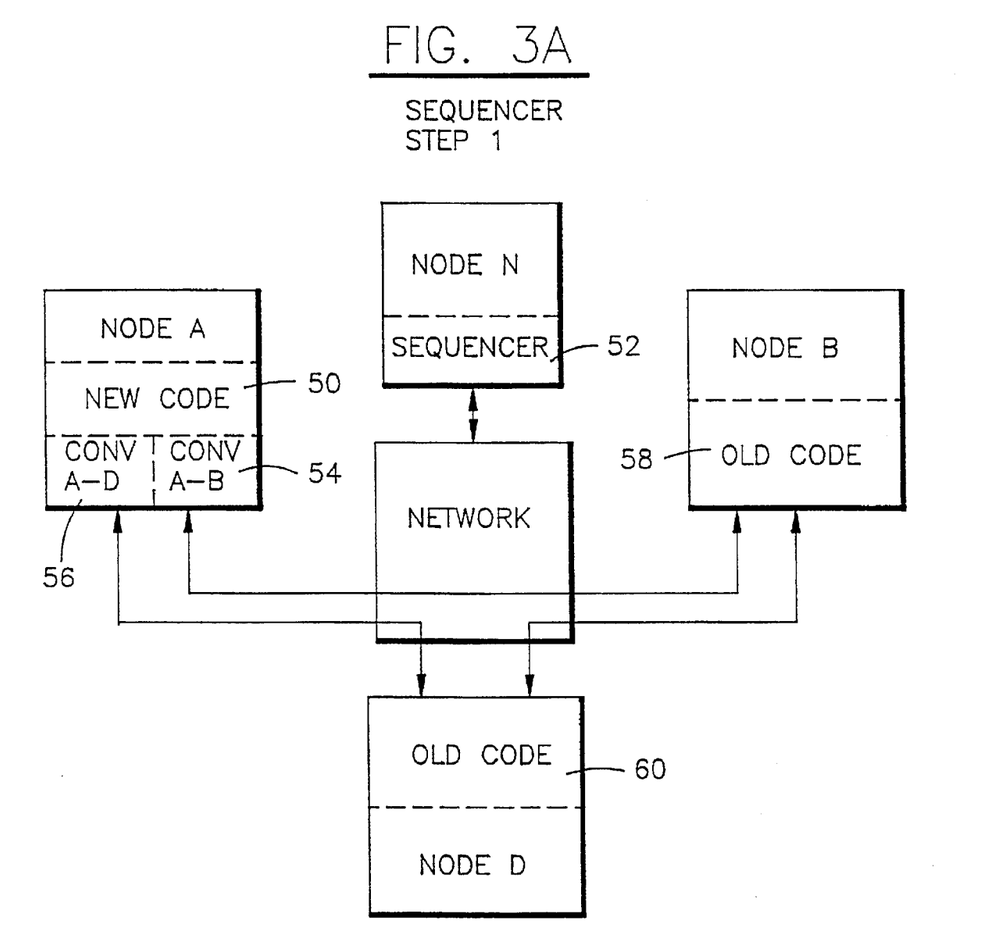
FIGS. 3a–3d are block diagrams showing how various nodes with different change levels of installed control code implement the invention.

Referring now to FIG. 3a, assume that node A has had installed thereon new operating microcode 50 that includes converters 54 and 56 which enable communications between nodes A and B and nodes A and D, respectively. Further assume that sequencer module 52 resides in another node (i.e. Node N) and includes a script which will control the sequence of new code installations. Nodes B and D still include old operating microcodes 58 and 60, respectively. When new operating microcode 50 is loaded into node A, converters 54 and 56 are initialized to enable node A to communicate with both nodes B and D, even though node A is operating under control of new operating microcode 50. Until nodes B and D are updated converters 54 and 56 remain active and enable continued communications between nodes A, B and D.

Figure 3B:
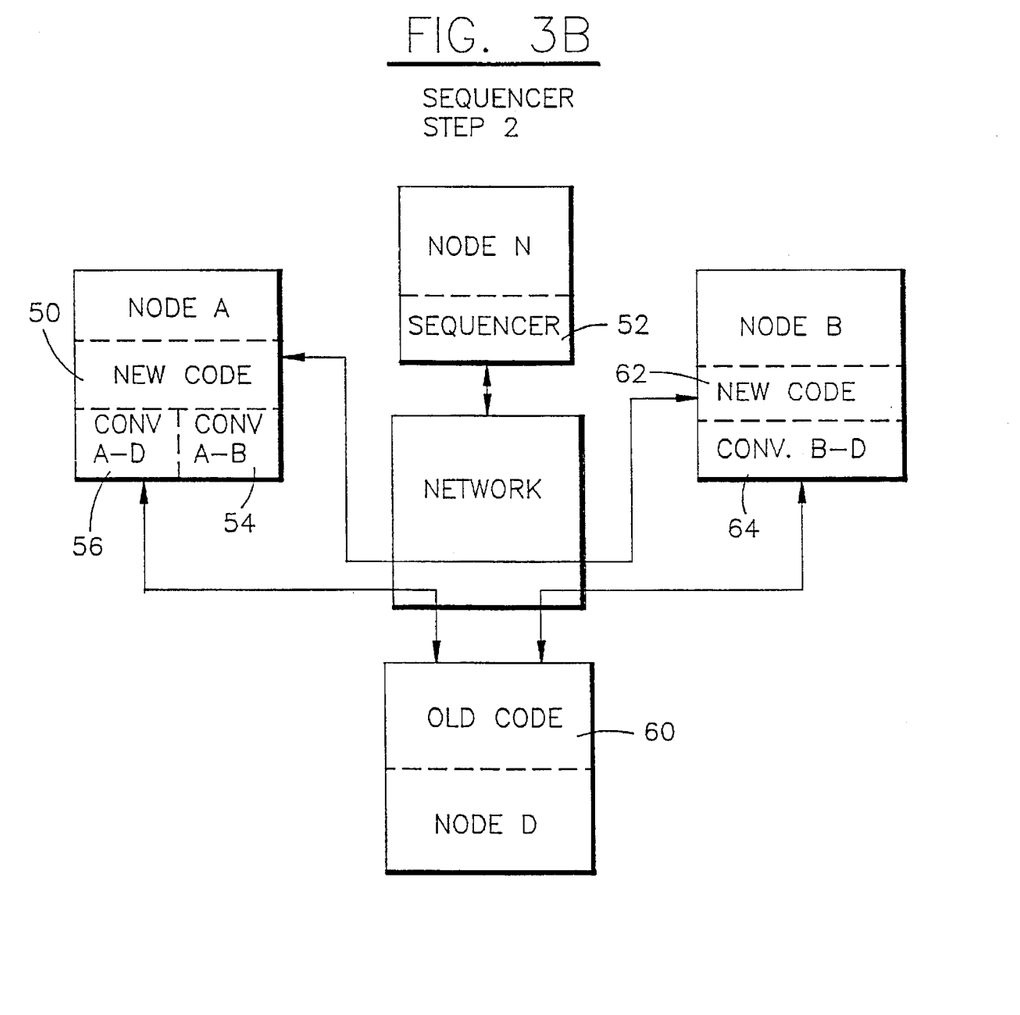

Sequencer step 2 which is illustrated in FIG. 3B, next causes old operating microcode 58 in node B to be supplanted by new operating microcode 62 which includes a converter module 64. Converter module 64 enables communications between new operating microcode 62 and old operating microcode 60 which still resides in node D. However, as new operating microcode 62 now resides in node B, it is enabled to directly communicate with new operating microcode 50 in node A. After new operating microcode 62 is installed on node B, converter is 54 is disconnected and enables communications between nodes A and B to occur directly between new operating microcode 50 and new operating microcode 62. For the time being, converter 54 remains in node A. Converter 64 in node B handles communications between new operating microcode 62 and old operating microcode 60 in node D.

Figure 3C:
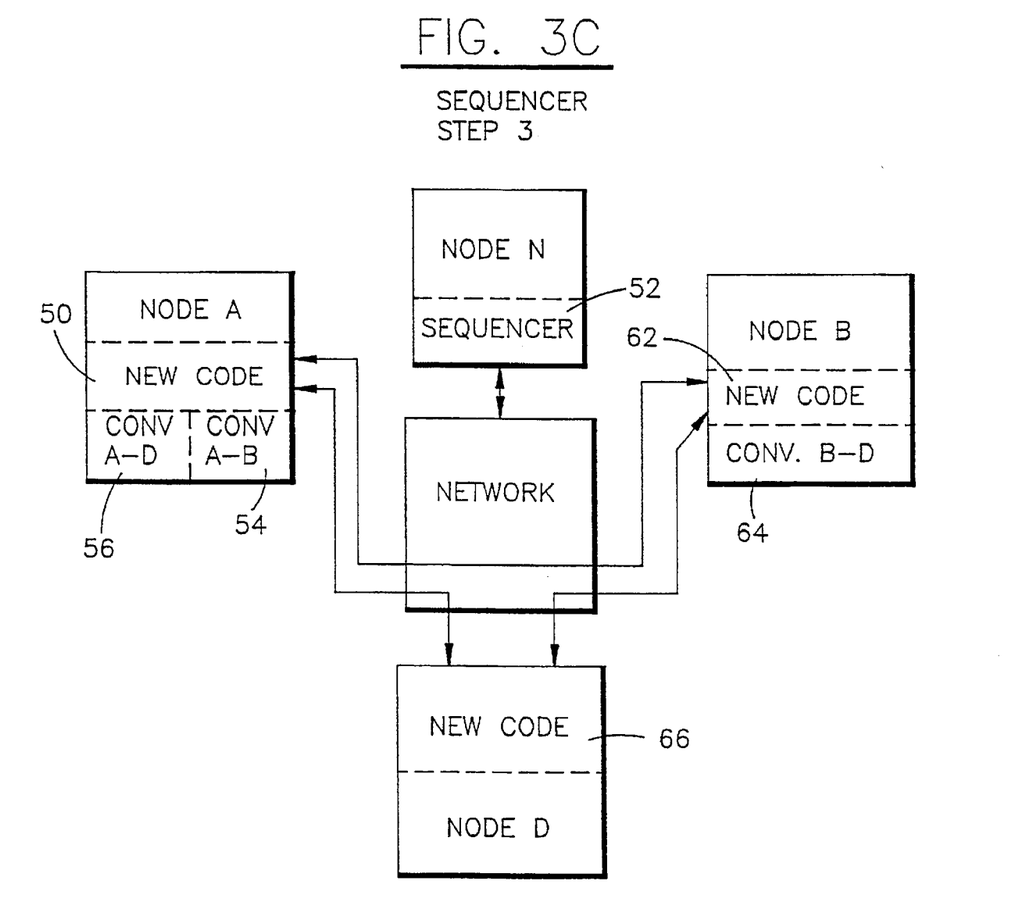

Sequencer step 3 (as shown in FIG. 3c) next causes new operating microcode 66 to be installed on node D. After initialization of new operating microcode 66, communications on all converters are deactivated as each of nodes A, B and D, now have new operating microcode installed and are enabled to directly communicate without intervening converter modules.

Figure 3D:
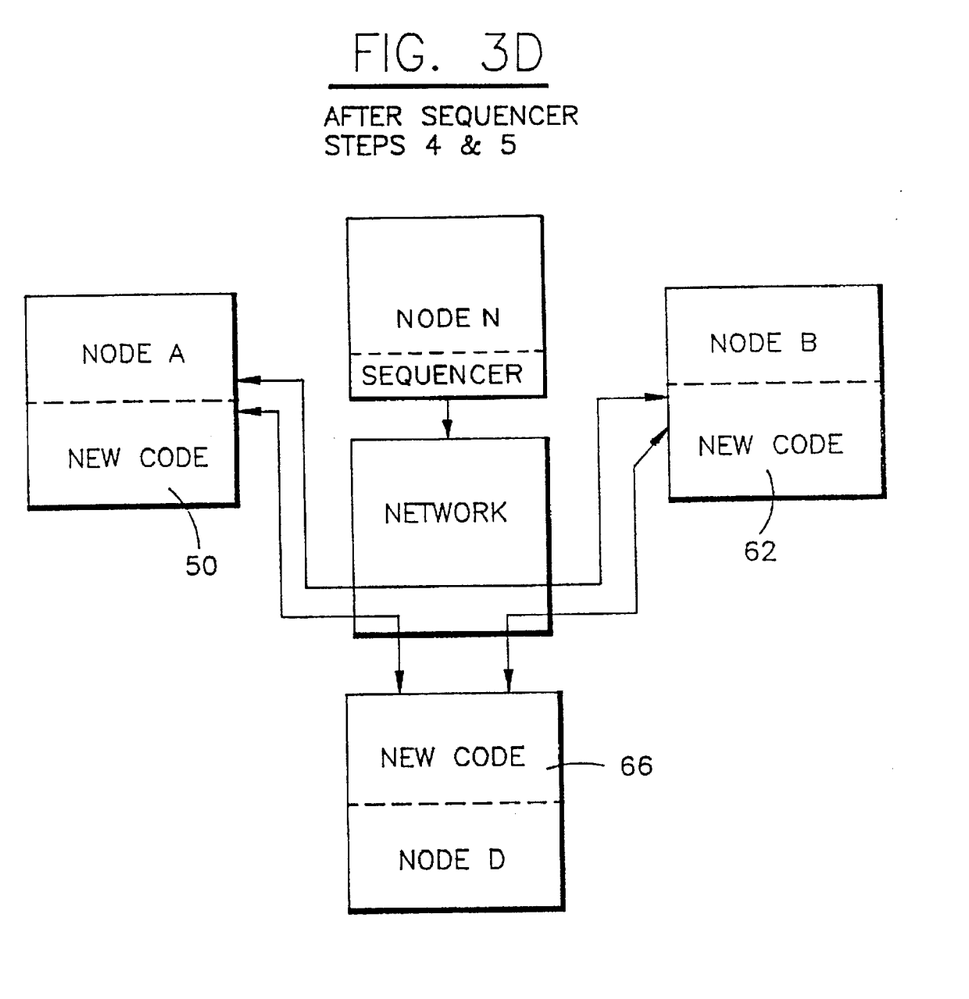

Sequencer 52 now proceeds through two additional steps (4 and 5) which causes removal of converter modules 54, 56 and 64 from nodes A and B (see FIG. 3D). At this stage, all nodes have been updated with the new operating microcode and the system is fully operational.

As above indicated, new code units (and converters) are loaded into the respective nodes in a sequence and while the nodes are in operation. Thus, assuming node A is the first node loaded, it is first taken out of service and the new code is loaded. When node A is put back in service, it communicates via its converter modules with other nodes in the system, thereby enabling the system to continue operations. Subsequently, node B is taken out of service and updated with a new code unit and a converter module and, when put back in service, the system continues operating with the converter modules in nodes A and B enabling communications to continue between both new code versions and old code units (e.g. in node D).

Any time communication is required from a node including a new code unit, the associated converter sends a message to the node with which communications are to occur and inquires as to the engineering change (EC) level of code resident therein. As shown in FIG. 2, an indication of the EC change level of code is maintained in memory interface 24. A node receiving an EC level inquiry responds with an indication of its EC level. If the received EC level is identical to that of the inquiring node, the associated converter employs the new interface. If the EC level is different, indicating that communications are to occur with a non-updated node, the old interface is implemented.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for updating a current version of control code in multiple nodes in a computing system while said computing system remains in operation, said computing system operable when a node is removed therefrom, said multiple nodes interconnected by a communications network, each node including a processor, memory, a current version of a control code and a first engineering change level (ECL) value for said current control code, said method comprising the steps of:

a isolating a first node from other nodes in said computing system;

b after said isolating step (a), installing in memory in said first node and operating a new version of control code having a second ECL value and a converter code module, said converter code module operating in conjunction with said processor in said first node to perform a first interface function and a second interface function during communications between said first node and a second node, said first interface function at least enabling communication between current versions of said control code, and said second interface function enabling communication between a current version of said control code and a new version of said control code;

c coupling said first node to other nodes in said computing system;

d operating said first node to perform an action which requires communications with said second node, said converter code module in said first node determining an ECL value stored in said second node and, if ECL values in said first and second nodes match, communicating with said second node through use of said first interface function, and if ECL values in said first and second nodes do not match, communicating with said second node through use of said second interface function which enables said current version of said control code to operate in conjunction with said new version of said control code.

2. The method as recited in claim 1, further comprising the steps of:

e isolating said second node from said computing system;

f installing in memory in said second node, said new version of said control code having a second ECL value and a converter code module, said converter code module operating in conjunction with said processor in said second node to enable and perform first and second interface functions during communications between said second node, first node and other nodes;

g coupling said second node to said computing system; and     h operating said first and second nodes to perform a function which requires communications between said first node, second node and other nodes, said converter code modules, comparing ECL values and, upon finding matching ECL values stored in said first and second nodes, enabling communications therebetween through use of said first interface function, and upon finding non-matching ECL values with said other node, communicating with said other node through use of said second interface function.

3. The method as recited in claim 1, wherein the computing system includes a sequencer code module that defines an order in which revised versions of said control code unit are to be installed in nodes of said computing system, said method including the step of:

installing said revised versions of said control code units on said nodes as specified by said sequencer control module.

4. Apparatus for updating control code in multiple nodes in a computing system while said computing system remains in operation, said computing system operable when a node is removed therefrom, said multiple nodes interconnected by a communications network, each node including a processor, memory, a first version of a control code unit and an engineering change level (ECL) value for said control code unit, said apparatus comprising:

means for installing in memory in a first node a revised version of said control code unit and a converter code module after said first node has been uncoupled from said computing system, said converter code module operating in conjunction with said processor in said first node to perform a first interface function and a second interface function during communications between said first node and a second node, said first interface function enabling communication between nodes with matching ECL values to enable interactive operation of nodes having said first version of said control code unit and said second interface function enabling communication between nodes with non-matching ECL values to enable interactive operation of a node having said first version of said control code unit and a node having said revised version of said control code unit;

means for re-coupling said first node into said computing system and operating said first node to perform a function which requires communications with said second node; and means for operating said converter code module in said first node to determine an ECL value stored in said second node and, if ECL values in said first and second nodes match, communicating with said second node through use of said first interface function, and if ECL values in said first and second nodes do not match, communicating with said second node through use of said second interface function.

5. Apparatus as recited in claim 4, further comprising:

means for installing a revised version of said control code unit and a converter code module in memory in said second node when said second node is uncoupled from said computing system, said converter code module operating in conjunction with said processor in said second node to enable and perform said first and second interface functions during communications between said second node, first node and other nodes;

means, operable after said second node is recoupled into said computing system, for operating said first and second nodes to perform a function which requires communications between said first node, second node and other nodes; and means for determining if matching ECL values are stored in said first and second nodes, and if yes, enabling communications therebetween through use of said first interface function in said converter code module, and if non-matching ECL values are found in said second node and said other node, communicating with said other node through use of said second interface function in said converter code module.

6. Apparatus as recited in claim 5, wherein said apparatus includes a sequencer code module that defines an order in which revised versions of said control code unit are to be installed in nodes of said computing system, said apparatus further comprising:

means in each node for operating in conjunction with said sequencer code module for installing said revised versions of said control code unit in the order specified by said sequencer control module.

7. A method for updating control code in multiple nodes in a computing system while said computing system remains in operation, said multiple nodes interconnected by a communications network, each node including a processor, memory, communication means, a first version of a control code unit that is a code module within operating microcode in said node and an engineering change level (ECL) value for said control code unit, said method comprising the steps of:

a isolating a current control code unit from said operating microcode in a first node;

b installing in memory in said first node in place of said current control code unit and operating, a revised version of said control code unit and a converter code module, said converter code module operating in conjunction with said processor in said first node to perform a first interface function and a second interface function when communications occur between said first node and a second node, said first interface function at least enabling communication between current control code units and said second interface function enabling communication between a current control code unit and a revised version of said control code unit;

c operating said first node to perform a function which requires communications with said second node, said converter code module in said first node determining an ECL value stored in said second node and, if ECL values in said first and second nodes match, communicating with said second node through use of said first interface function, and if ECL values in said first and second nodes do not match, communicating with said second node through use of said second interface function, whereby a first node with a current control code unit is able to interact with a second node which has either a current control code unit or a revised control code unit.

8. The method as recited in claim 7, further comprising the steps of:

d isolating said current control code unit from said operating microcode in a second node;

e installing in memory in said second node in place of said isolated control code unit, a revised version of said control code unit and a converter code module, said converter code module operating in conjunction with said processor in said second node to enable and perform said first and second interface functions during communications between said second node, first node and other nodes in said computing system;

f coupling said revised version of said control code unit to operating microcode in said second node; and g operating said first and second nodes to perform a function which requires communications between said first node, second node and said other nodes, said converter code modules determining ECL values and, upon finding matching ECL values stored in said first and second nodes, enabling communications therebetween through use of said first interface function, and upon finding non-matching ECL values with said other node, communicating with said other node through use of said second interface function.

9. The method as recited in claim 7, wherein the computing system includes a sequencer code module that defines an order in which revised versions of said control code unit are to be installed in nodes of said computing system, said method including the step of:

installing said revised versions of said control code units on said nodes as specified by said sequencer control module.

* * * * *